(12) United States Patent
Asai

(10) Patent No.: US 9,191,546 B2
(45) Date of Patent: Nov. 17, 2015

(54) NON-TRANSITORY COMPUTER-READABLE RECORDING MEDIUM STORING COMPUTER-READABLE INSTRUCTIONS FOR INFORMATION PROCESSING APPARATUS, INFORMATION PROCESSING APPARATUS, AND METHOD FOR CONTROLLING INFORMATION PROCESSING APPARATUS

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/490,215

(22) Filed: Sep. 18, 2014

(65) Prior Publication Data
US 2015/0077782 A1 Mar. 19, 2015

(30) Foreign Application Priority Data
Sep. 18, 2013 (JP) ................................. 2013-193034

(51) Int. Cl.
*H04N 1/333* (2006.01)
*H04N 1/04* (2006.01)
*H04N 1/00* (2006.01)

(52) U.S. Cl.
CPC ........... *H04N 1/333* (2013.01); *H04N 1/00408* (2013.01); *H04N 1/00474* (2013.01); *H04N 1/00482* (2013.01); *H04N 1/00941* (2013.01); *H04N 1/00954* (2013.01); *H04N 1/00973* (2013.01); *H04N 2201/0075* (2013.01); *H04N 2201/0081* (2013.01); *H04N 2201/0089* (2013.01); *H04N 2201/0093* (2013.01); *H04N 2201/0094* (2013.01); *H04N 2201/0096* (2013.01); *H04N 2201/333* (2013.01)

(58) Field of Classification Search
USPC ....................................................... 358/1.13
See application file for complete search history.

(56) References Cited

U.S. PATENT DOCUMENTS

| 8,019,853 B2 | 9/2011 | Machida | |
|---|---|---|---|
| 2005/0055641 A1* | 3/2005 | Machida | 715/734 |
| 2006/0039029 A1* | 2/2006 | Yagita | 358/1.15 |

FOREIGN PATENT DOCUMENTS

JP   2000-315182 A   11/2000

* cited by examiner

*Primary Examiner* — Ngon Nguyen
(74) *Attorney, Agent, or Firm* — Banner & Witcoff, Ltd.

(57) ABSTRACT

An information processing apparatus may be configured to communicate with a plurality of devices. The information processing apparatus may determine an input source and an input function. The input source may be one of the devices and the information processing apparatus. The input function may be processed in the input source. The information processing apparatus may determine at least two output destinations and at least two output functions. Each of the at least two output destinations may be one of the devices and the information processing apparatus. Each of the at least two output functions may be processed in each of the at least two output destinations respectively. The information processing apparatus may output first data received from the input function to the at least two output destinations.

14 Claims, 14 Drawing Sheets

FIG. 8

| | Identification Information | | Input Function | Input Function Display Setting | Output Function | Output Function Display Setting |
|---|---|---|---|---|---|---|
| | Device Name (611) | IP Address (612) | (602) | (603) | (606) | (607) |
| 1 | Information Processing Apparatus 100 | 192.168.100.101 | — | — | Write | On |
| 2 | Inkjet MFP 200 | 192.168.100.102 | Scan | On | Print | On / Off |
| 3 | Scanner 300 | 192.168.100.103 | Readout | On | Write | — |
| 4 | Color Laser Printer 400 | 192.168.100.104 | Scan | On | — | — |
| ... | ... | ... | ... | ... | Print | Off |
| | | | | | ... | ... |

| | Identification Information | | Input Function | Input Function Display Setting | Output Function | Output Function Display Setting |
|---|---|---|---|---|---|---|
| | Service Name (651) | IP Address (652) | (642) | (643) | (644) | (645) |
| 1 | Service A (Server 511) | 192.168.100.111 | Download from Folder A | On | Upload to Folder A | Off |
| 2 | Service B (Server 512) | 192.168.100.112 | Download from Folder B | On | Upload to Folder B | On |
| | | | Download from Folder C | On | Upload to Folder C | On |
| | | | Download from Folder D | On | Upload to Folder D | On |
| ... | ... | ... | Download from Folder E | ... | Upload to Folder E | On |

FIG. 10

| | Combinational Pattern Name | Input Function | Input Setting Values | Output Function | Output Function Values | |
|---|---|---|---|---|---|---|
| 1 | Copy & Storage Function | Scan Function (Scanner 300) | Document Size: A4 Scanning Resolution: High Color Mode: Color | Print Function (Color Laser Printer 400) | Document Size: A4 Scanning Resolution: High Color Mode: Color | R11 |
| | | | | Upload to Folder A (Service A) | --- | |
| 2 | Copy & Storage Function | Scan Function (Inkjet MFP 200) | Document Size: B5 Scanning Resolution: High Color Mode: Black and White | Print Function (Color Laser Printer 400) | Document Size: B5 Scanning Resolution: Mid Color Mode: Black and White | |
| | | | | Write Function (Information Processing Apparatus 100) | --- | |
| 3 | Copy & Storage Function | Scan Function (Scanner 300) | Document Size: A4 Scanning Resolution: Mid Color Mode: Color | Print Function (Inkjet MFP 200) | Document Size: A4 Scanning Resolution: Mid Color Mode: Color | R13 |
| | | | | Write Function (Inkjet MFP 200) | --- | |
| 4 | Copy Function | Download from Folder E (Service B) | | Print Function (Color Laser Printer 400) | Document Size: A4 Scanning Resolution: High Color Mode: Color | |
| 5 | Storage Function | Scan Function (Scanner 300) | Document Size: A4 Scanning Resolution: High Color Mode: Color | Write Function (Information Processing Apparatus 100) | --- | R12 |
| 6 | Copy Function | Scan Function (Scanner 300) Scan Function (Inkjet MFP 200) | Document Size: A4 Scanning Resolution: High Color Mode: Color | Print Function (Color Laser Printer 400) | Document Size: A4 Scanning Resolution: High Color Mode: Color | R14 |
| ... | ... | ... | ... | ... | ... | |

TB3

NON-TRANSITORY COMPUTER-READABLE RECORDING MEDIUM STORING COMPUTER-READABLE INSTRUCTIONS FOR INFORMATION PROCESSING APPARATUS, INFORMATION PROCESSING APPARATUS, AND METHOD FOR CONTROLLING INFORMATION PROCESSING APPARATUS

CROSS-REFERENCE TO RELATED APPLICATION

This application claims priority to Japanese Patent Application No. 2013-193034, filed on Sep. 18, 2013, the contents of which are hereby incorporated by reference into the present application.

TECHNICAL FIELD

A technology disclosed in this specification relates to an image processing apparatus, a recording medium therefor, and a method for controlling an image processing apparatus that is configured to cause a plurality of devices to execute image processing.

DESCRIPTION OF RELATED ART

Technologies have been known in which a plurality of devices (e.g. a scanner and a printer) connected in a network is used in combination. An example of the known technologies is as follows: Icons representing the devices in the network, respectively, are displayed by a display unit on an information processing apparatus (e.g. a PC). A user drags and drops the icon representing one device (e.g. a scanner) on the screen onto the icon representing another device (e.g. a printer). The information processing apparatus controls each of the two devices in accordance with an instruction.

SUMMARY

In a combined use of a plurality of devices on a network, data that is outputted from one device may be relayed by an information processing apparatus to be used in another device. Proposed is a new technology for handling data with an information processing apparatus in such a case.

In one aspect of the teachings disclosed herein, a non-transitory computer-readable recording medium storing computer-readable instructions for an information processing apparatus may be provided. The information processing apparatus may be configured to communicate with a plurality of devices. The information processing apparatus may comprise a processor. The computer-readable instructions, when executed by the processor, may cause the information processing apparatus to perform receiving a first instruction indicating an input source. The input source may be one of the plurality of devices and the information processing apparatus. The computer-readable instructions may cause the information processing apparatus to perform receiving a second instruction indicating an input function. The input function may be processed in the input source indicated in the first instruction. The computer-readable instructions may cause the information processing apparatus to perform receiving a third instruction indicating at least two output destinations. Each of the at least two output destinations may be one of the plurality of devices and the information processing apparatus. The computer-readable instructions may cause the information processing apparatus to perform receiving a fourth instruction indicating at least two output functions. Each of the at least two output functions may be processed in each of the at least two output destinations respectively. The computer-readable instructions may cause the information processing apparatus to perform receiving an execution-start instruction. The computer-readable instructions may cause the information processing apparatus to perform transmitting a command to the input source in response to receiving the execution-start instruction. The computer-readable instructions may cause the information processing apparatus to perform receiving first data from the input source. The first data may be generated in the input source by processing the input function in response to the command. The computer-readable instructions may cause the information processing apparatus to perform outputting second data related to the received first data to the at least two output destinations.

BRIEF DESCRIPTION OF THE DRAWINGS

FIG. 8 shows an example of a registered device table TB1;

FIG. 9 shows an example of a registered service table TB2;

FIG. 10 shows an example of a combination pattern registration table TB3;

EMBODIMENT

Configuration of Network 10

Figure 1:
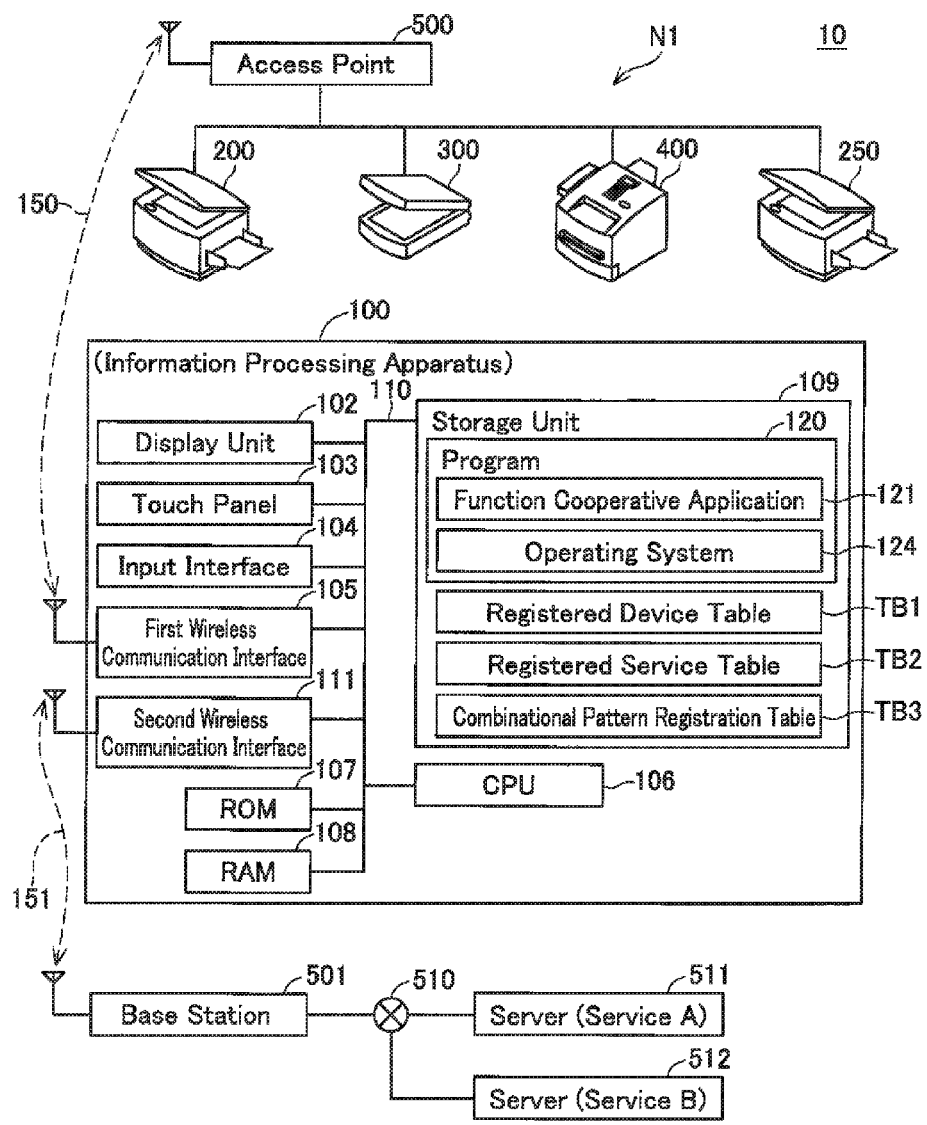
FIG. 1 is a block diagram showing a configuration of a network.

FIG. 1 is a block diagram showing a configuration of a network 10. The network 10 includes an information processing apparatus 100, inkjet MFPs 200 and 250, a scanner 300, a color laser printer 400, an access point 500, a base station 501, the Internet 510, and servers 511 and 512. As used herein, the term "MFP" refers to a multifunction peripheral having a print function, a scan function, etc. (i.e. is referred to as "Multi-Function Peripheral").

The information processing apparatus 100 is capable of communicating with a network N1 via a first wireless communication interface 105 and the access point 500. The network N1 is a local area network. Connected to the network N1 are the inkjet MFPs 200 and 250, the scanner 300, and the color laser printer 400. Further, the information processing apparatus 100 is also capable of communicating with the Internet 510 via a second wireless communication interface 111 and the base station 501. The Internet 510 is a broader area communication network than the network N1. Connected to the Internet 510 are the servers 511 and 512. The servers 511 and 512 are apparatuses that provide storage services that allow various types of data to be stored. This specification describes a case where a service A is provided by the server 511 and a service B is provided by the server 512.

<Configuration of Information Processing Apparatus 100>

The information processing apparatus 100 may be a portable apparatus such as a portable phone or a portable terminal apparatus. The information processing apparatus 100 includes a display unit 102, a touch panel 103, an input interface 104, the first wireless communication interface 105, a CPU 106, RAM 108, a storage unit 109, the second wireless communication interface 111, etc., and these components are connected to one another via an input and output port 110.

The display unit 102 receives a picture signal that is outputted from the CPU 106, and displays an image based on the picture signal thus received. Usable examples of the display unit 102 include an LCD, an OLED (organic light-emitting diode) panel, etc. The touch panel 103 is formed by a transparent member and is disposed in such a manner as to cover a surface of the display unit 102. The touch panel 103 detects the position of an area on the touch panel that a user has tapped with a finger, and outputs positional information thus detected to the CPU 106. Hereinafter, reception by the CPU 106 of positional information that is outputted from the touch panel 103 is expressed as acceptance by the CPU 106 of tapping. The input interface 104 is, for example, an operation button. Depressing the input interface 104 activates the information processing apparatus 100.

The CPU 106 executes a program stored in the storage unit 109. The RAM 108 acts as a temporary storage for information necessary for processing in the CPU 106. The storage unit 109 is constituted by a combination of a flash memory, an HDD (referred to as Hard Disk Drive), and a buffer of the CPU 106, etc. The storage unit 109 has stored therein various types of information such as account information. The account information is information for logging into the service A that is provided by the server 511 and the service B that is provided by the server 512.

The storage unit 109 has a program 120 stored therein. The program 120 includes a function cooperative application 121 and an operating system 124. The CPU 106 executes a process in accordance with the program 120. The operating system 124 is a program that provides a basic function which is utilized by the function cooperative application 121 and the like.

The function cooperative application 121 is an application for executing one combinational pattern by combining at least one input function and at least one output function with each other and by causing them to cooperate with each other. The input function and the output function are each a function that is provided by any of a plurality of devices communicably connected to the information processing apparatus 100 or by the information processing apparatus 100 in itself. Examples of the plurality of devices include the inkjet MFPs 200 and 250, the scanner 300, the color laser printer 400, the servers 511 and 512, and the information processing apparatus 100.

The input function is a function for generating first data that is inputted to the function cooperative application 121. Examples of the input function include a scan function, a read function, and a download function. The scan function is a function of generating image data by scanning a document. The scan function is performed, for example, by the inkjet MFP 200 or 250 or the scanner 300. The read function is a function of reading out data stored in a storage medium. The read function is performed, for example, by the inkjet MFP 200 or 250 or the information processing apparatus 100. The download function is a function of obtaining, through a network, data stored in a server. The download function is performed, for example, by the server 511 or 512.

The output function is a function of executing any of various types of process with use of second data that is outputted by the function cooperative application 121. Examples of the output function include a print function, a write function, and an upload function. The print function is a function of executing a print process with use of image data. The print function is performed, for example, by the inkjet MFP 200 or 250 or the color laser printer 400. The write function is a function of causing data that is outputted from the function cooperative application 121 to be stored in a storage medium. The write function is performed, for example, by the information processing apparatus 100 or the inkjet MFP 200 or 250. The upload function is a function of causing data that is outputted from the function cooperative application 121 to be stored in a server via a network. The upload function is performed, for example, by the server 511 or 512.

Examples of the combinational pattern include a copy function, a storage function, and a copy & storage function. The copy function is a function that is fulfilled by a combination of the scan function selected as the input function and the print function selected as the output function. The copy function makes it possible to carry out a copy process of printing a scanned document. The storage function is a combination of the scan function, the read function, or the download function selected as the input function and the write function or the upload function selected as the output function. The storage function makes it possible, for example, to cause image data generated by scanning a document to be stored in a storage medium or a storage sewer. For the copy & storage function, the scan function, the read function, or the download function is selected as the input function, and a plurality of functions, i.e. the print function and the write function or the upload function, are selected as the output functions. The copy & storage function makes it possible, for example, to print image data generated by scanning a document and to cause the image data thus generated to be stored in a storage medium or the like.

Further, the storage unit 109 has stored therein a registered device table TB1, a registered service table TB2, and a combinational pattern registration table TB3. The registered device table TB1 is a table in which to store a registered device, i.e. a device that provides an input function or an output function which constitutes a combinational pattern. The registered device is selected in advance by the user and stored in the registered device table TB1.

FIG. 8 shows an example of the registered device table TB1. The registered device table TB1 has stored therein information regarding registered devices, namely identification information 601, input function 602, input function display setting 603, output function 606, and output function display setting 607. The identification information 601 is information for identifying the registered devices. The identification information 601 includes device name 611 and IP address 612. The device name 611 is information for identifying each of the registered devices. The IP address 612 is a well-known bit sequence for use in communication, assigned to each separate one of the registered devices. The input function display setting 603 is information for determining whether or not to display an input function on an input function selection accepting screen that is displayed in the below-mentioned step S425 or S455. The output function display setting 607 is information for determining whether or not to display an output function on an output function selection accepting screen that is displayed in the below-mentioned step S525 or S555.

The registered service table TB2 is a table in which to store a registered service, i.e. a service that provides an input function or an output function which constitutes a combinational pattern. The registered service is selected in advance by the user and stored in the registered service table TB2.

FIG. 9 shows an example of the registered service table TB2. The registered service table TB2 has stored therein information regarding registered services, namely identification information 641, input function 642, input function display setting 643, output function 644, and output function display setting 645. The identification information 641 includes service name 651 and IP address 652.

Falling under the input function 642 are downloads from folders. That is, an input function corresponds to selecting any of a plurality of folders provided by a service and downloading data stored in a selected folder. Falling under the output function 644 are uploads to folders. That is, an output function corresponds to selecting any of a plurality of folders provided by a service and uploading data to a selected folder for storage. The input function display setting 643 is information for determining whether or not to display an input function on an input function selection accepting screen that is displayed in the below-mentioned step S425 or S455. The output function display setting 645 is information for determining whether or not to display an output function on an output function selection accepting screen that is displayed in the below-mentioned step S525 or S555.

The combinational pattern registration table TB3 is a table in which to store a combinational pattern of an input function and an output function. FIG. 10 shows an example of the combinational pattern registration table TB3. The combinational pattern registration table TB3 has stored therein combinational pattern name 621, input function 622, input setting values 623, output function 625, and output setting values 626. The combinational pattern name 621 is information for identifying each separate combination 1 pattern. A combinational pattern is constituted by a combination of an input function 622 and an output function 625. The input setting values 623 are various setting values at which data is inputted by an input function 622. For example, in a case where the input function 622 is a scan function, examples of the input setting values 623 include document size, scanning resolution, color mode, etc. The output setting values 626 are various setting values at which data is outputted by an output function 625. For example, in a case where the output function 625 is a print function, examples of the output setting values 626 include paper size, printing resolution, color mode, etc.

In the ensuing explanation, the CPU 106 to execute programs such as the function cooperative application 121 and the operating system 124 is sometimes simply referred to by the program name. For example, the indication of "function cooperative application 121" may mean "the CPU 106 that executes the function cooperative application 121".

<Operation of the Function Cooperative Application 121>

Figure 2:
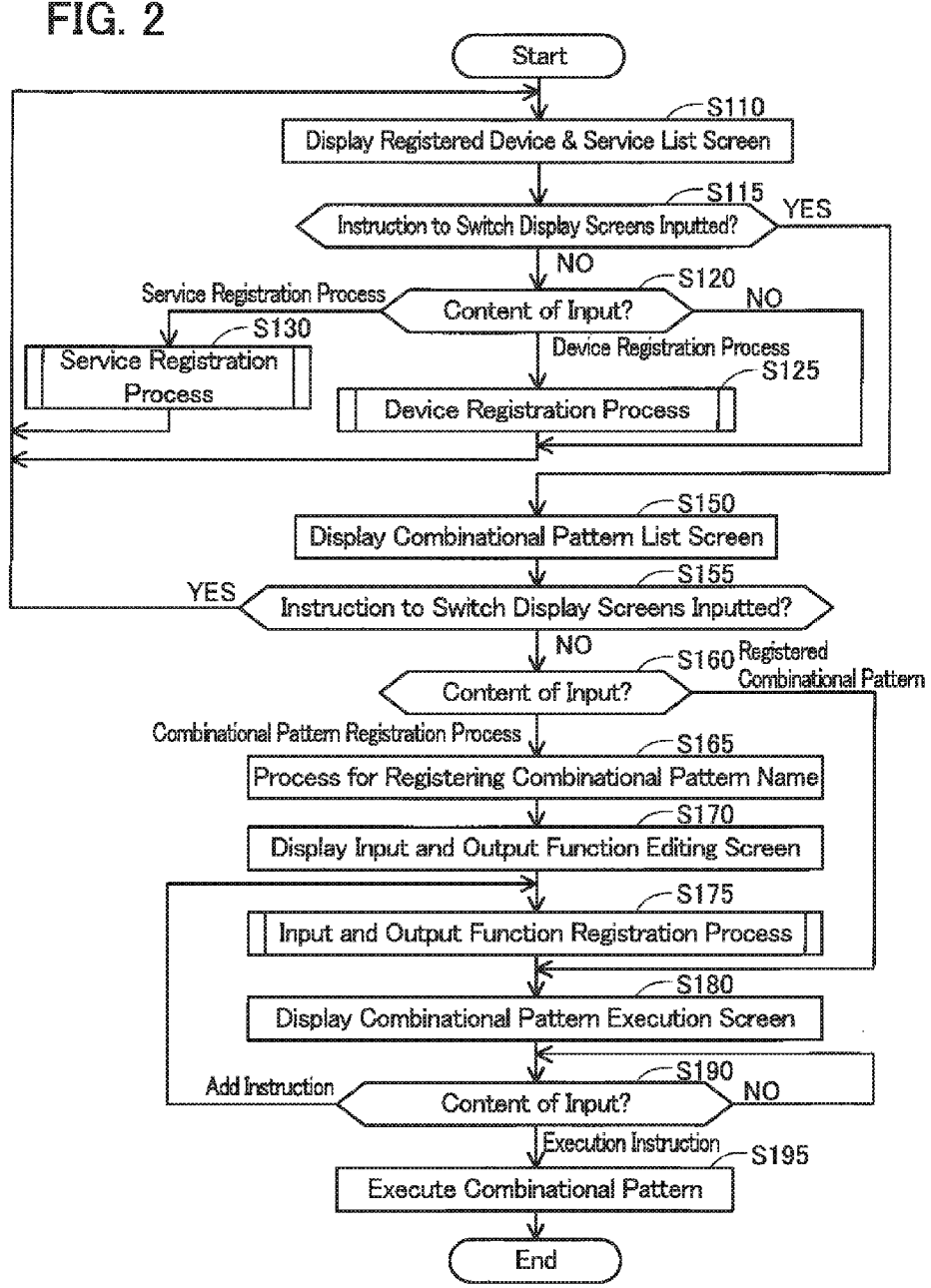
FIG. 2 is a flow chart of a main process in which a CPU controls each of the units in accordance with a function cooperative application.
Figure 3:
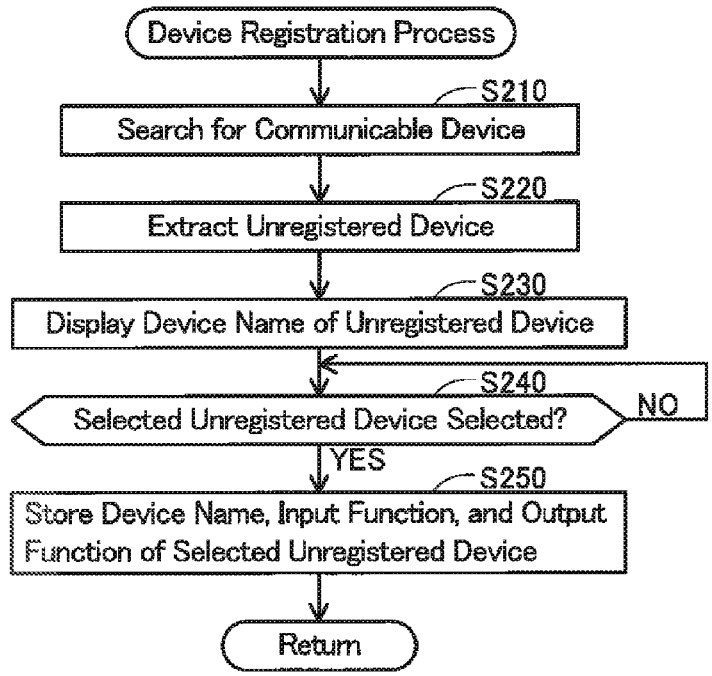
FIG. 3 is a flow chart of a device registration process in which the CPU controls each of the units in accordance with the function cooperative application.

Processes in which the CPU 106 controls each of the units in accordance with the function cooperative application 121 are described below with reference to FIGS. 2 through 5. Once the function cooperative application 121 is activated, the flow shown in FIG. 2 is started.

Figure 11:
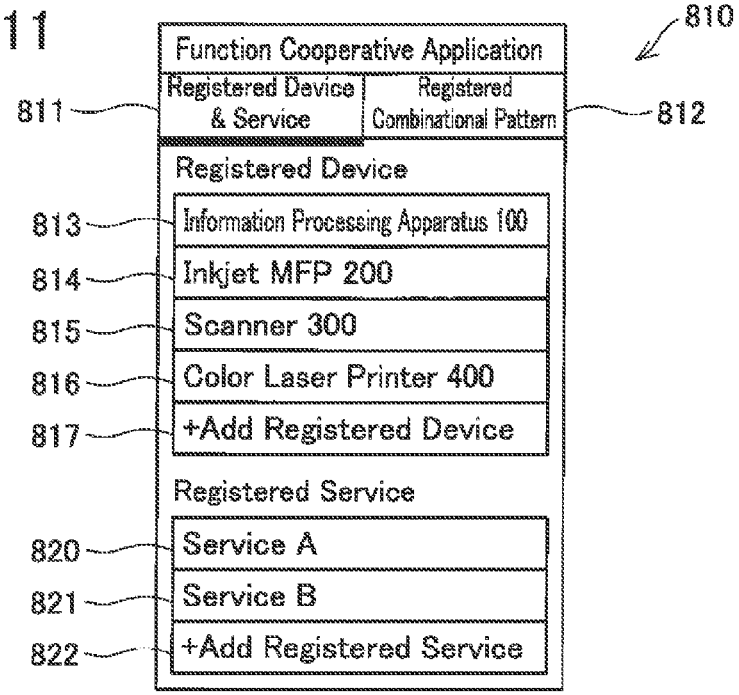
FIG. 11 shows an example display of a registered device & service list screen.

In step S110, the CPU 106 causes the display unit 102 to display a registered device & service list screen 810. The registered device & service list screen 810 is a screen that shows a list of the registered devices registered in the registered device table TB1 and the registered services registered in the registered service table TB2. FIG. 11 shows an example of the registered device & service list screen 810. The registered device & service list screen 810 contains tab images 811 and 812, registered device images 813 to 816, a registered device-add button image 817, registered service images 820 and 821, and a registered service-add button image 822. The tab images 811 and 812 are images for accepting an instruction for the display unit 102 to switch between displaying the registered device & service list screen 810 and displaying the below-mentioned registered combinational pattern list screen 830. The registered device images 813 to 816 are images representing the registered devices, respectively. The registered device-add button image 817 is an image for accepting an operation of adding and storing a registered device. The registered service images 820 and 821 are images representing the registered services, respectively. The registered service-add button image 822 is an image for accepting an operation of adding and storing a registered service.

In step S115, the CPU 106 determines whether or not a switch instruction to switch between the display screens has been inputted. This determination may be made depending on whether or not the tab image 812 has been tapped. If the determination is negative (S115: NO), the CPU 106 proceeds to step S120.

In step S120, the CPU 106 waits for a process execution command to be inputted. If the CPU 106 determines that a process execution command has not been inputted (S120: NO), the CPU 106 returns to step S110. On the other hand, if the CPU 106 determines that a process execution command to execute a device registration process has been inputted (S120: Device Registration Process), the CPU 106 proceeds to step S125. This determination may be made depending on whether or not the registered device-add button image 817 has been tapped.

In step S125, the CPU 106 executes the device registration process. The device registration process is a process by which to cause a new device to be stored in the registered device table TB1. The device registration process is described with reference to FIG. 3. In step S210, the CPU 106 searches for a communicable device, i.e. a device that is capable of communicating with the information processing apparatus 100. The search for a communicable device may be performed by broadcasting information (e.g. ping) for confirmation of communication. In step S220, the CPU 106 extracts, from among the communicable devices thus found, an unregistered device, i.e. a device that has not been registered as a registered device. An unregistered device may be extracted with reference to the registered device table TB1 (see FIG. 8). In step S230, the CPU 106 causes the display unit 102 to display a list of the device names of unregistered devices.

In step S240, the CPU 106 determines whether or not a selected unregistered device has been selected. A selected unregistered device is an unregistered device selected from among the unregistered devices displayed on the list as a target to be registered in the registered device table TB1. This determination may be made depending on whether or not any of the unregistered devices displayed on the list has been tapped. If the determination is negative (S240: NO), the CPU 106 returns to step S240. If the determination is positive (S240: YES), the CPU 106 proceeds to step S250.

In step S250, the CPU 106 obtains input function information and output function information from the selected unregistered device. The input function information is information representing an input function provided in the selected unregistered device. The output function information is information representing an output function provided in the selected unregistered device. The input function information and the output function information may be stored in the selected unregistered device as MIB (referred to as Management Information Base) information. The CPU 106 causes the input function represented by the input function information thus obtained and the output function represented by the output function information thus obtained to be newly stored in the registered device table TB1, together with the device name of the selected unregistered device. Then, the CPU 106 returns to step S110.

On the other hand, if the CPU 106 determines in step S120 that an execution command to execute a service registration process has been inputted (S120: Service Registration Process), the CPU 106 proceeds to step S130. This determination may be made depending on whether or not the registration service-add button image 822 has been tapped. In step S130, the CPU 106 executes the service registration process. The service registration process is a process by which to cause a new service to be stored in the registered service table TB2.

Figure 4:
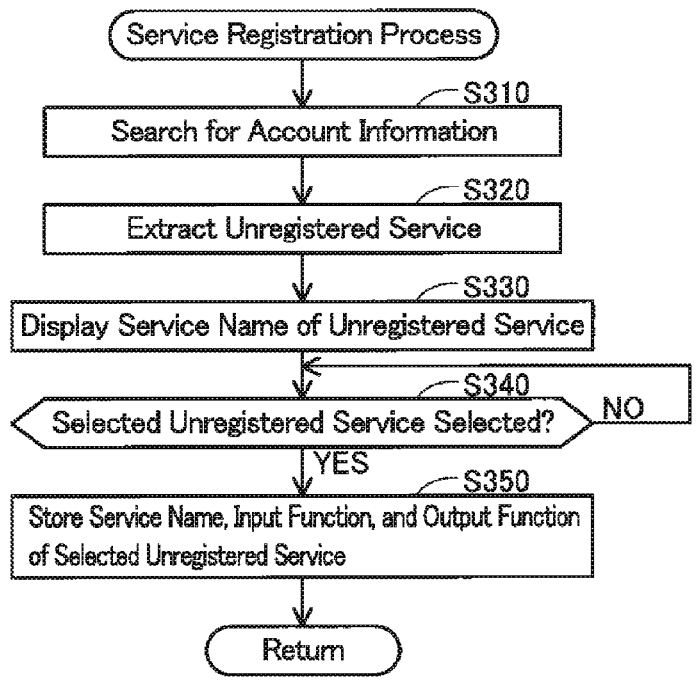
FIG. 4 is a flow chart of a service registration process in which the CPU controls each of the units in accordance with the function cooperative application.

The service registration process is described with reference to FIG. 4. In step S310, the CPU 106 searches for account information stored in the storage unit 109.

In step S320, the CPU 106 extracts, from among services corresponding to the account information thus found, an unregistered service, i.e. a service that has not been registered as a registered service. An unregistered service may be extracted with reference to the registered service table TB2 (see FIG. 9). In step S330, the CPU 106 causes the display unit 102 to display a list of the service names of unregistered services.

In step S340, the CPU 106 determines whether or not a selected unregistered service has been selected. A selected unregistered service is an unregistered service selected from among the unregistered services displayed on the list as a target to be registered in the registered service table TB2. If the determination is negative (S340: NO), the CPU 106 returns to step S340. If the determination is positive (S340: YES), the CPU 106 proceeds to step S350.

In step S350, the CPU 106 obtains input function information and output function information from the selected unregistered service. The CPU 106 causes the input function represented by the input function information thus obtained and the output function represented by the output function information thus obtained to be newly stored in the registered service table TB2, together with the service name of the selected unregistered service. Then, the CPU 106 returns to step S110.

Figure 12:
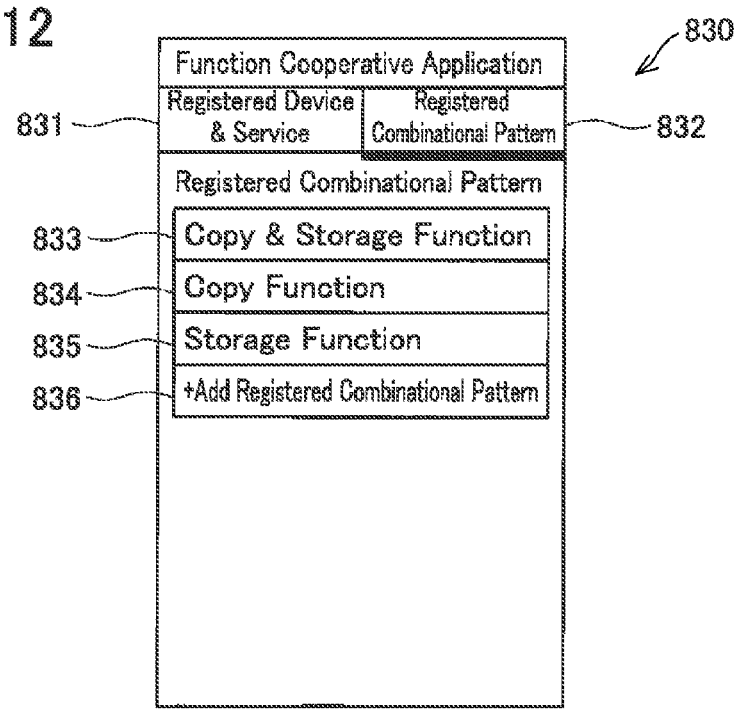
FIG. 12 shows an example display of a registered combinational pattern list screen.

On the other hand, if the determination in step S115 of FIG. 2 is positive (S115: YES), the CPU 106 proceeds to step S150. In step S150, the CPU 106 causes the display unit 102 to display a registered combinational pattern list screen 830. The registered combinational pattern list screen 830 is a screen that shows a list of the registered combinational patterns registered in the registered combinational pattern table TB3. FIG. 12 shows an example of the registered combinational pattern list screen 830. The registered combinational pattern list screen 830 contains tab images 831 and 832, registered combinational pattern images 833 to 835, and a registered combinational pattern-add button image 836. The tab images 831 and 832 are images for accepting an instruction for the display unit 102 to switch between displaying the registered device & service list screen 810 and displaying the below-mentioned registered combinational pattern list screen 830. The registered combinational pattern images 833 to 835 are images representing the registered combinational patterns, respectively. The registered combinational pattern-add button image 836 is an image for accepting an operation of adding and storing a combinational pattern.

In step S155, the CPU 106 determines whether or not a switch instruction to switch between the display screens has been inputted. This determination may be made depending on whether or not the tab image 831 has been tapped. If the determination is positive (S155: YES), the CPU 106 returns to step S110. If the determination is negative (S155: NO), the CPU 106 proceeds to step S160. In step S160, the CPU 106 waits for a process execution command to be inputted. If the CPU 106 determines that a process execution command to execute a registered combinational pattern has been inputted (S160: Registered Combinational Pattern), the CPU 106 proceeds to step S180. This determination may be made depending on whether or not any of the registered combinational pattern images 833 to 835 has been tapped.

On the other hand, if the CPU 106 determines that a process execution command to execute a combinational pattern registration process has been inputted (S160: Combinational Pattern Registration Process), the CPU 106 proceeds to step S165. The combinational pattern registration process is a process by which to generate and store a newly-registered combinational pattern, i.e. a combinational pattern that is newly registered. This determination may be made depending on whether or not the registered combinational pattern-add button image 836 has been tapped. In step S165, the CPU 106 executes a process of registering the combinational pattern name of a newly-registered combinational pattern. For example, input of the combinational pattern name may be accepted via the input interface 104. Then, the name thus inputted may be stored as a new combinational pattern name 621 in the registered combinational pattern table TB3 (see FIG. 10).

Figure 13:
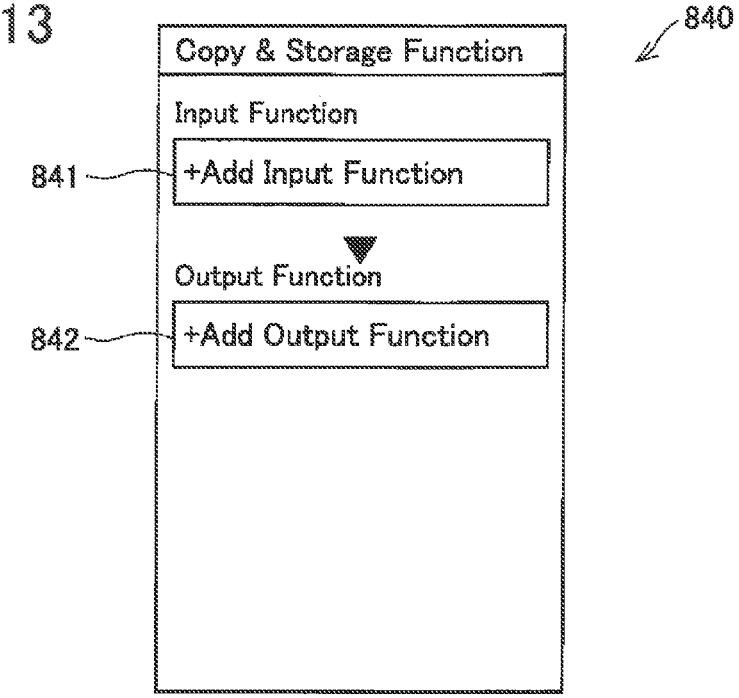
FIG. 13 shows an example display of an input and output function editing screen.

In step S170, the CPU 106 causes the display unit 102 to display an input and output function editing screen 840. The input and output function editing screen 840 is a screen for editing an input function and an output function that constitute a newly-registered combination pattern. FIG. 13 shows an example of the input and output function editing screen 840. The input and output function editing screen 840 contains an input function-add button image 841 and an output function-add button image 842. The input function-add button image 841 and the output function-add button image 842 are images for accepting operations of adding and storing an input function and an output function that constitute a newly-registered combination pattern, respectively.

In step S175, the CPU 106 executes an input and output function registration process. The input and output function registration process is a process by which to register an input function and an output function that constitute a newly-registered combination pattern. The content of the input and output function registration process is described with reference to FIGS. 5 through 7B. In step S410, the CPU 106 determines the content of an instruction from the user. If any instruction has not been inputted (S410: NO), the CPU 106 returns to step S410. On the other hand, if the CPU 106 determines that it has been instructed to register an output function (S410: Output Function), the CPU 106 proceeds to step S515. This determination may be made depending on whether or not the output function-add button image 842 has been tapped.

In step S515, the CPU 106 executes a process for displaying an output device & service selection accepting screen. The output device & service selection accepting screen is a screen for accepting selection of a device or service that provides an output function of a newly-registered combinational pattern. The content of the process for displaying the output device & service selection accepting screen is described with reference to FIG. 7B.

In step S610, the CPU 106, using a pointer, points to a registered device having an output function or a registered service having an output function from among the registered devices registered in the registered device table TB1 (see FIG. 8) and the registered services registered in the registered service table TB2 (see FIG. 9).

In step S620, the CPU 106 determines whether or not the registered device or registered service pointed to with the pointer is already selected as a device or service that provides an output function of the newly-registered combinational pattern. This determination is made on the basis of the combinational pattern registration table TB3. If the determination is negative (S620: NO), the CPU 106 proceeds to step 630. In step S630, the CPU 106 accesses the registered device table TB1 in a case where it is a registered device that has been pointed to with the pointer. Then, the CPU 106 sets the output function display setting 607 to on for all output functions provided in the registered device pointed to with the pointer. Alternatively, the CPU 106 accesses the registered service table TB2 in a case where it is a registered service that has been pointed to with the pointer. Then, the CPU 106 sets the output function display setting 645 to "on" for all output functions provided in the registered service pointed to with the pointer. Then, the CPU 106 proceeds to step S670.

On the other hand, if the determination in step S620 is positive (S620: YES), the CPU 106 proceeds to step 640. In step S640, the CPU 106 determines whether or not all of the output functions provided in the registered device or registered service pointed to with the pointer is already selected as an output function of the newly-registered combinational pattern. If the determination is positive (S640: YES), the CPU 106 proceeds to step S660. In step S660, the CPU 106 accesses the registered device table TB1 in a case where it is a registered device that has been pointed to with the pointer. Then, the CPU 106 sets the output function display setting 607 to "off" for all output functions provided in the registered device pointed to with the pointer. Alternatively, the CPU 106 accesses the registered service table TB2 in a case where it is a registered service that has been pointed to with the pointer. Then, the CPU 106 sets the output function display setting 645 to "off" for all output functions provided in the registered service pointed to with the pointer. Then, the CPU 106 proceeds to step S670.

On the other hand, if the determination in step S640 is negative (S640: NO), the CPU 106 proceeds to step 650. In step S650, the CPU 106 accesses the registered device table TB1 in a case where it is a registered device that has been pointed to with the pointer. Then, the CPU 106 sets the output function display setting 607 to "off" for an output function, among the output functions provided in the registered device pointed to with the pointer, which has already been selected as an output function of the newly-registered combinational pattern, and sets the output function display setting 607 to "on" for the other output function(s). Alternatively, the CPU 106 accesses the registered service table TB2 in a case where it is a registered service that has been pointed to with the pointer. Then, the CPU 106 sets the output function display setting 645 to "off" for an output function, among the output functions provided in the registered service pointed to with the pointer, which has already been selected as an output function of the newly-registered combinational pattern, and sets the output function display setting 645 to "on" for the other output function(s). Then, the CPU 106 proceeds to step S670.

In step S670, the CPU 106 determines whether or not all of the registered devices registered in the registered device table TB1 and all of the registered services registered in the registered service table TB2 have been pointed to with the pointer. If the determination is negative (S670: NO), the CPU 106 returns to step S610. If the determination is positive (S670: YES), the CPU 106 proceeds to step S680.

Figure 14:
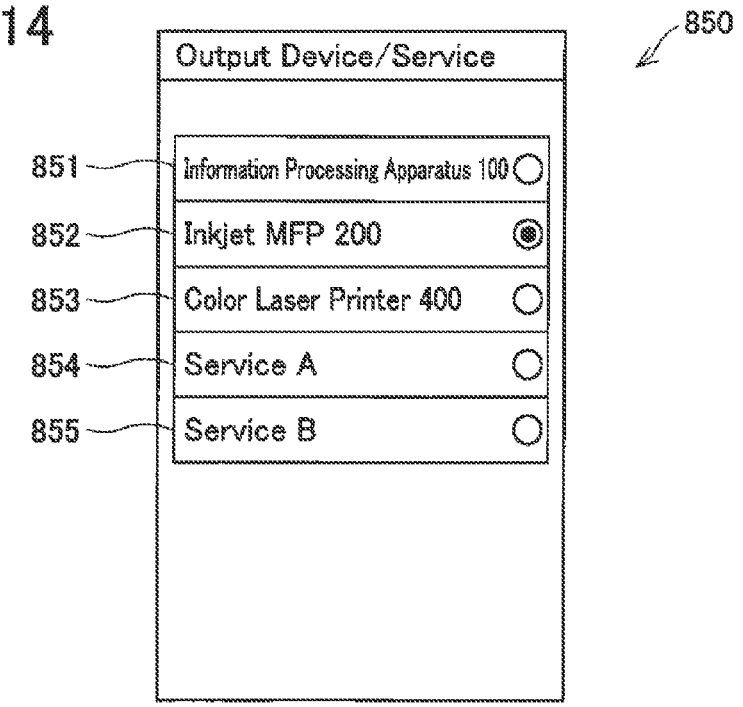
FIG. 14 shows an example display of a device selection accepting screen.

In step S680, the CPU 106 causes the display unit 102 to display an output device & service selection accepting screen 850. FIG. 14 shows an example of the output device & service selection accepting screen 850. The output device & service selection accepting screen 850 contains button images 851 to 855. The button images 851 to 853 are each an image for accepting an operation of selecting a device that provides an output function of a newly-registered combinational pattern. The button images 854 and 855 are each an image for accepting an operation of selecting a service that provides an output function of a newly-registered combinational pattern. Then, the CPU 106 proceeds to step S520 of FIG. 6.

In step S520, the CPU 106 determines whether or not selection of a device or service has been accepted. This determination may be made depending on whether or not any of the button images 851 to 855 has been tapped. If the determination is negative (S520: NO), the CPU 106 returns to step S520. On the other hand, if the CPU 106 determines that a device has been selected (S520: Device), the CPU 106 proceeds to step S525. It may be in a case where any of the button images 851 to 853 has been tapped that the CPU 106 determines that a device has been selected.

In step S525, the CPU 106 causes the display unit 102 to display an output function selection accepting screen 860. The output function selection accepting screen 860 is a screen for accepting selection of an output function that constitutes a newly-registered combinational pattern. The output function selection accepting screen 860 shows only an output function for which the output function display setting 607 has been set to "on" on the registered device table TB1.

Figure 15:
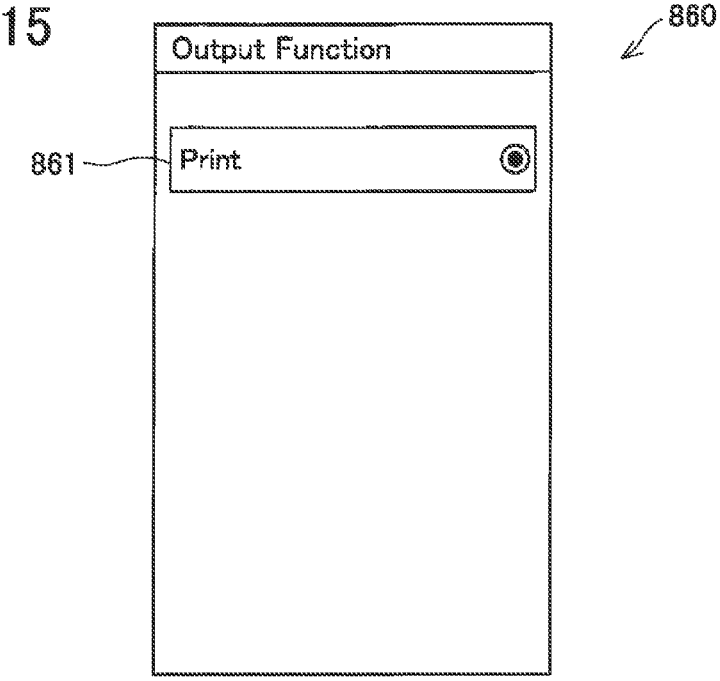
FIG. 15 shows an example display of an output function selection accepting screen for a registered device.

FIG. 15 shows an example of the output function selection accepting screen 860. The output function selection accepting screen 860 contains a button image 861. The button image 861 is an image for accepting an operation of selecting an output function of a newly-registered combinational pattern.

The present embodiment describes, as an example, a case where the button image 852 was tapped in step S520 and the inkjet MFP 200 was selected accordingly. In this case, as indicated by the region R1 on the registered device table TB1 of FIG. 8, the output function display setting 607 for the print function is "on" and the output function display setting 607 for the write function is "off". Therefore, the output function selection accepting screen 860 shown in FIG. 15 shows only the button image 861, which represents the print function.

In step S530, the CPU 106 determines whether or not an output function has been selected. This determination may be made depending on whether or not a button image displayed on the output function selection accepting screen 860 has been tapped. If the determination is negative (S530: NO), the CPU 106 returns to step S530. If the determination is positive (S530: YES), the CPU 106 proceeds to step S535.

Figure 16:
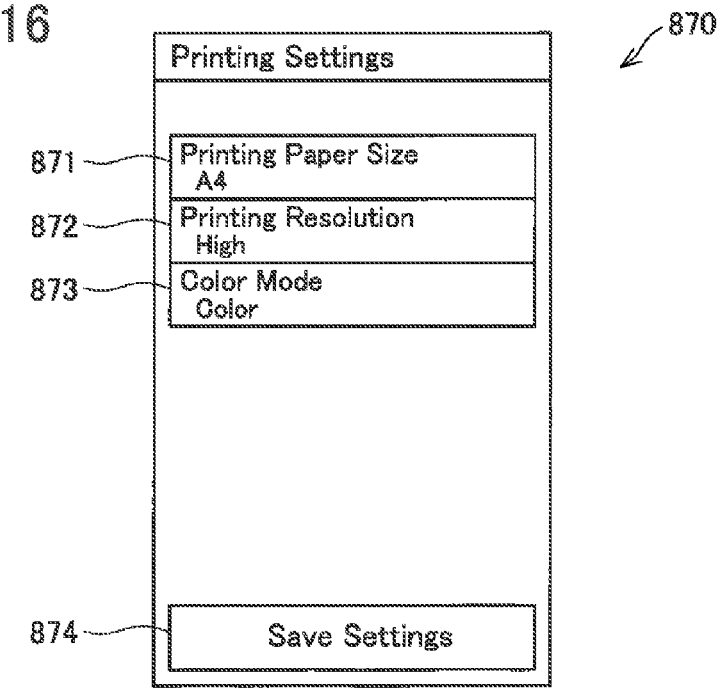
FIG. 16 shows an example display of an output setting screen.

In step S535, the CPU 106 causes the display unit 102 to display an output setting screen 870. The output setting screen 870 is a screen for accepting a change to output setting values 626 concerning the output function selected in step S530. FIG. 16 shows an example of the output setting screen 870. The output setting screen 870 contains button images 871 to 874. The button images 871 to 873 are images for accepting changes to the settings of printing paper size, printing resolution, and color mode, respectively. The button image 874 is an image for accepting an instruction to store the setting values thus changed.

In step S540, the CPU 106 executes a process for changing the output setting values 626. For example, tapping of the button image 871 may cause a list of setting candidate values (e.g. A4, B5, Letter, Postcard) for printing paper size to be displayed. Moreover, a value selected by the user from among the setting candidate values may be adopted as a new output setting value.

In step S545, the CPU 106 determines whether or not a registration instruction to register an output setting value has been outputted. This determination may be made depending on whether or not the button image 874 has been tapped. If the determination is negative (S545: NO), the CPU 106 returns to step S545. If the determination is positive (S545: YES), the CPU 106 proceeds to step S550.

In step S550, the CPU 106 causes the output function 625 selected in step S530 and the output setting values 626 selected in step S540 to be stored in a region on the combinational pattern registration table TB3 where the newly-registered combinational pattern is stored. Then, the CPU 106 proceeds to step S580.

Figure 17:
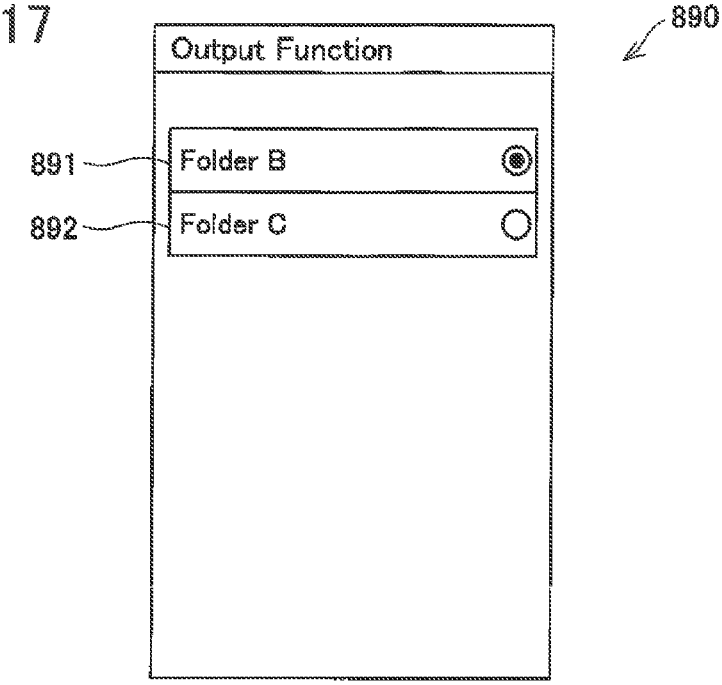
FIG. 17 shows an example display of an output function selection accepting screen for a registered service.

On the other hand, if the CPU 106 determines in step S520 that a service has been selected (S520: Service), the CPU 106 proceeds to step S555. In step S555, the CPU 106 causes the display unit 102 to display an output function selection accepting screen 890. FIG. 17 shows an example of the output function selection accepting screen 890. The output function selection accepting screen 890 contains button images 891 and 892. The button images 891 and 892 are each an image for accepting an operation of selecting an output function of a newly-registered combinational pattern.

The present embodiment describes, as an example, a case where the button image 854 was tapped in step S520 and the service A was selected accordingly. In this case, as indicated by the region R2 on the registered service table TB2 of FIG. 9, the output function display setting 645 for a folder A is "off" and the output function display setting 645 for folders B and C is "on". Therefore, the output function selection accepting screen 890 shown in FIG. 17 shows the button images 891 and 892, which represent the folders B and C respectively.

In step S560, the CPU 106 determines whether or not any of the folders has been selected as an output function. If the determination is negative (S560: NO), the CPU 106 returns to step S560. If the determination is positive (S560: YES), the CPU 106 proceeds to step S565.

In step S565, the CPU 106 determines whether or not a registration instruction to register an output function has been outputted. If the determination is negative (S565: NO), the CPU 106 returns to step S565. If the determination is positive (S565: YES), the CPU 106 proceeds to step S570. In step S570, the CPU 106 causes the folder selected in step S560 to be stored in a region on the combinational pattern registration table TB3 where the newly-registered combinational pattern is stored. Then, the CPU 106 proceeds to step S580.

In step S580, the CPU 106 determines whether or not an input function of the newly-registered combinational pattern has already been registered. If the determination is negative (S580: NO), the CPU 106 proceeds to step S590. In step S590, the CPU 106 sets the display mode of a process execution button image to "non-display". The process execution button image will be described later. Then, the CPU 106 proceeds to step S180 of FIG. 2. On the other hand, if the determination is positive (S580: YES), the CPU 106 proceeds to step S585. In step S585, the CPU 106 sets the display mode of the process execution button image to "display". Then, the CPU 106 proceeds to step S180.

Figure 5:
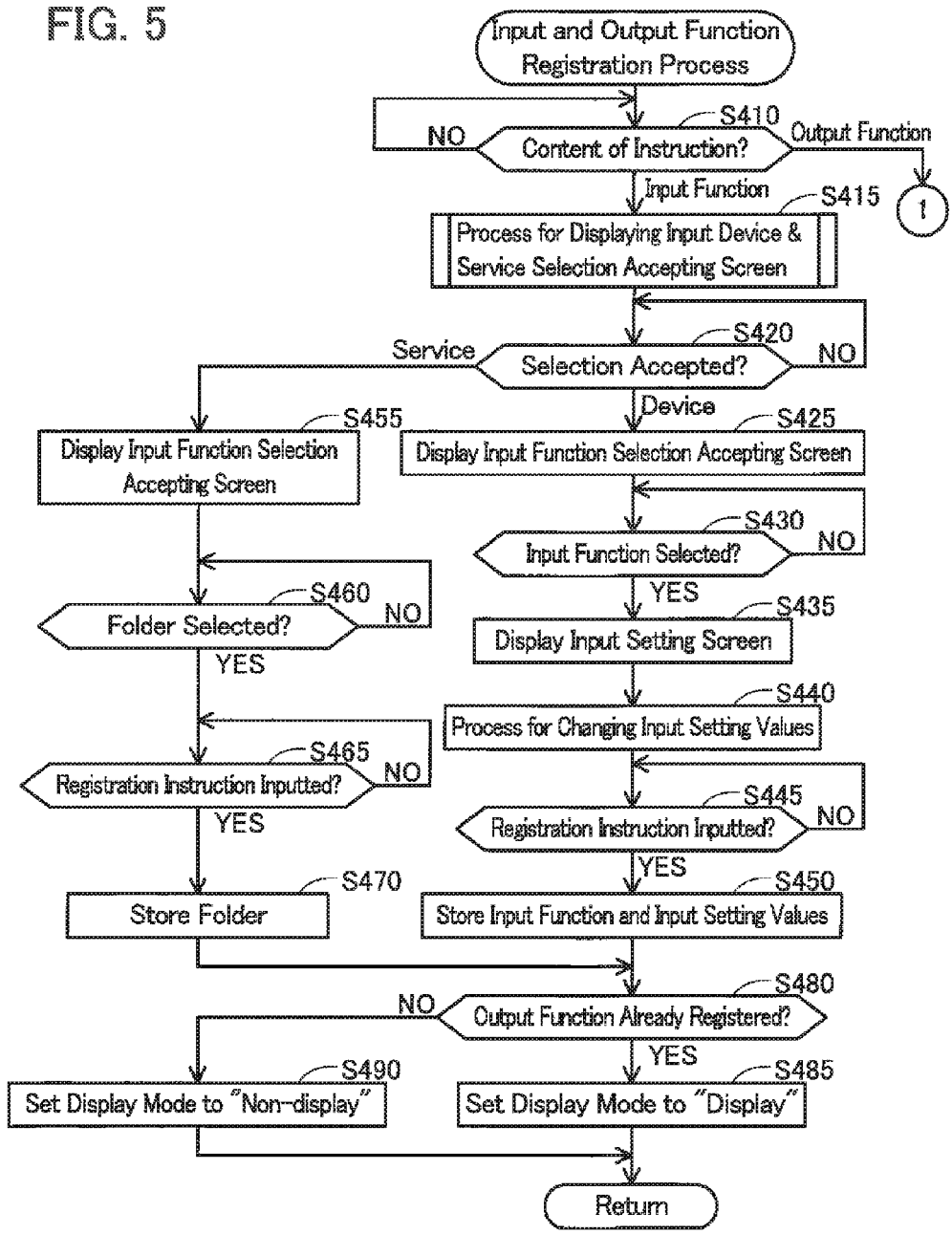
FIG. 5 is a flow chart of an input and output function registration process in which the CPU controls each of the units in accordance with the function cooperative application.
Figure 7A:
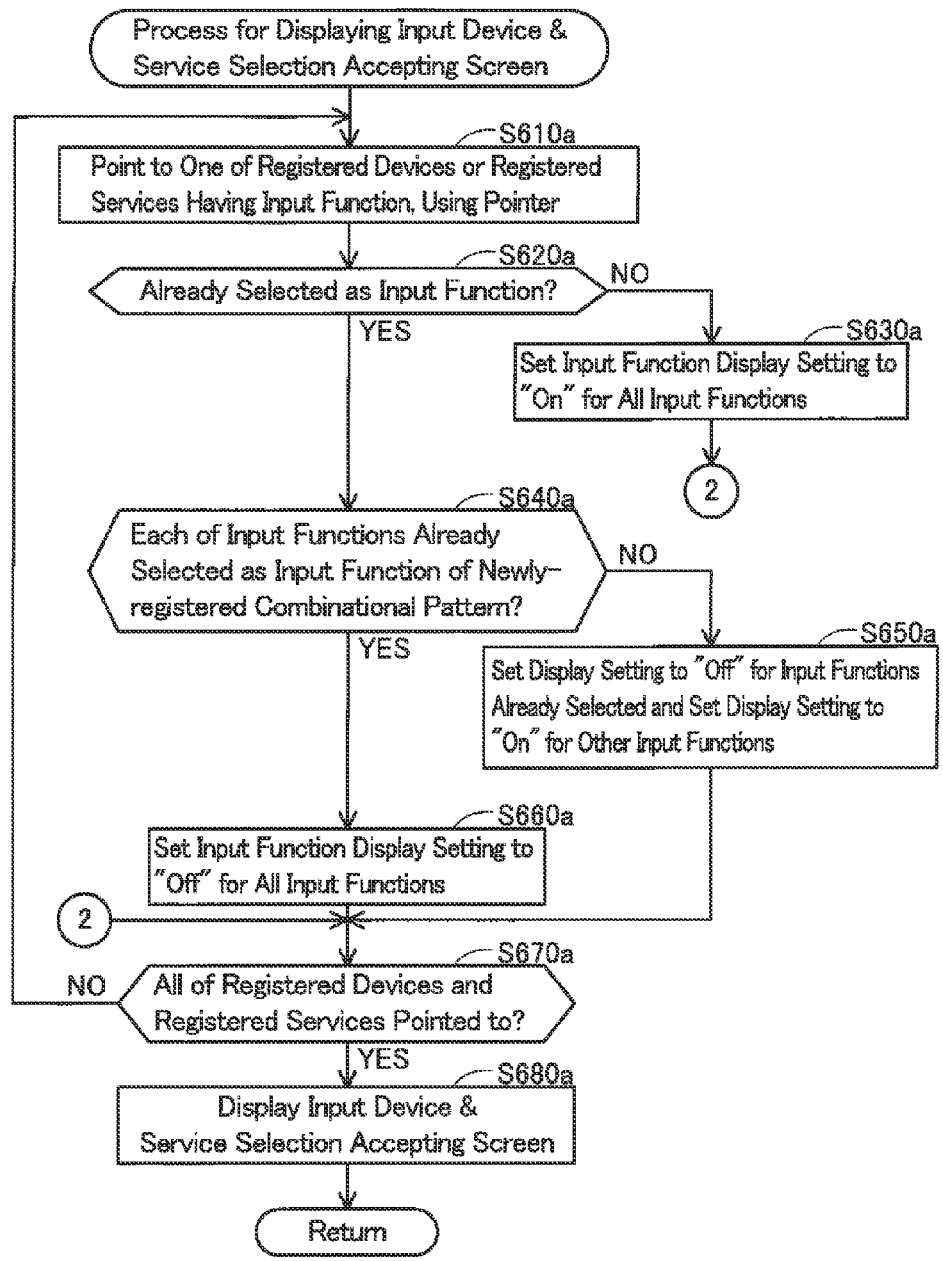
FIG. 7A is a flow chart of a process for displaying an input device & service selection accepting screen in which process the CPU controls each of the units in accordance with the function cooperative application.
Figure 7B:
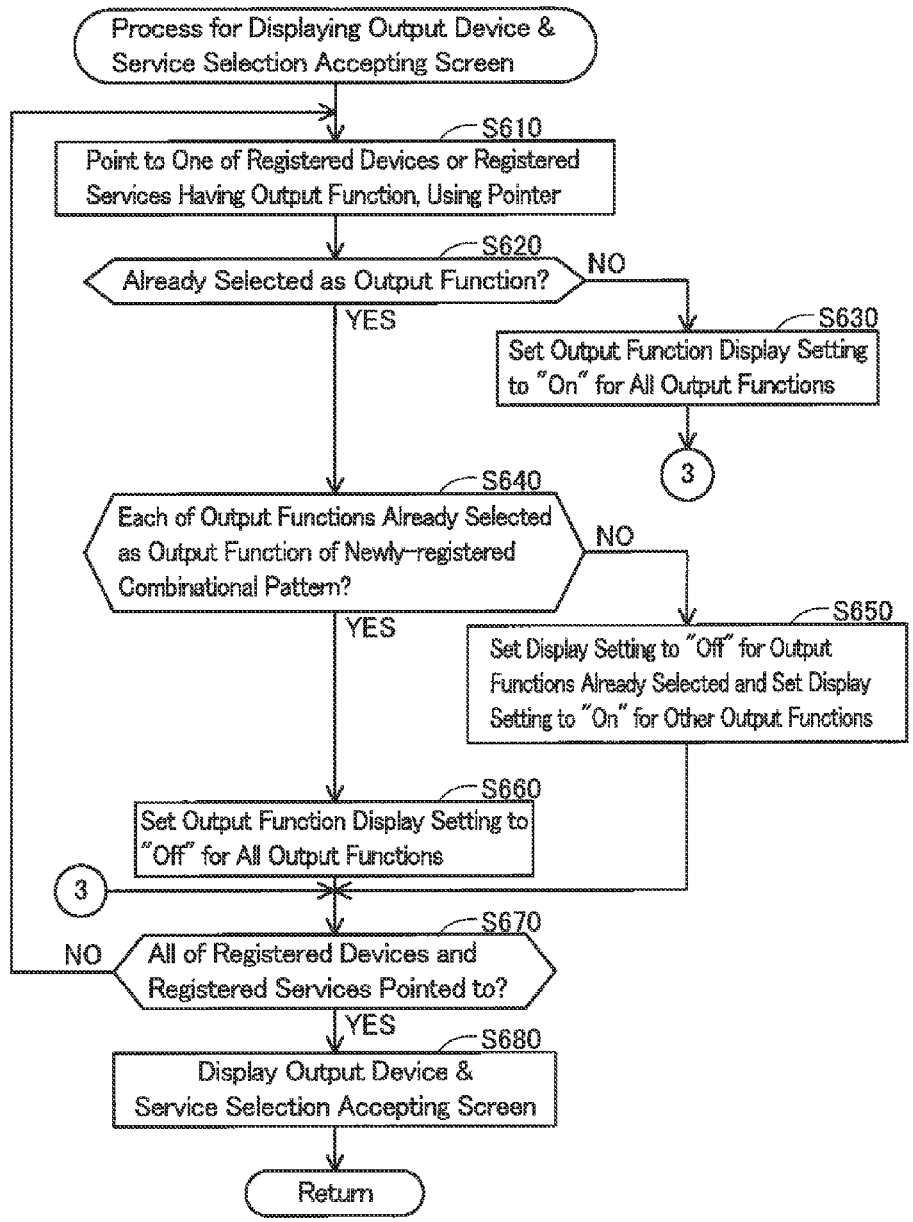
FIG. 7B is a flow chart of a process for displaying an output device & service selection accepting screen in which process the CPU controls each of the units in accordance with the function cooperative application.

On the other hand, if the CPU 106 determines in step S410 of FIG. 5 that an instruction to register an input function has been given (S410: Input Function), the CPU 106 proceeds to step S415. In step S415, the CPU 106 executes a process for displaying an input device & service selection accepting screen. The input device & service selection accepting screen is a screen for accepting selection of a device or service that provides an input function of a newly-registered combinational pattern. FIG. 7A shows the content of the process for displaying the input device & service selection accepting screen. The content of the process shown in the flow of FIG. 7A is the same as the content of the process, described with reference to FIG. 7B, for displaying the output device & service selection accepting screen. Specifically, the term "output function" in the process in steps S610 to S680 needs only be read as "input function" in the process in steps S610a to S680a. Therefore, the process in steps S610a to S680a is not described in detail here.

Figure 6:
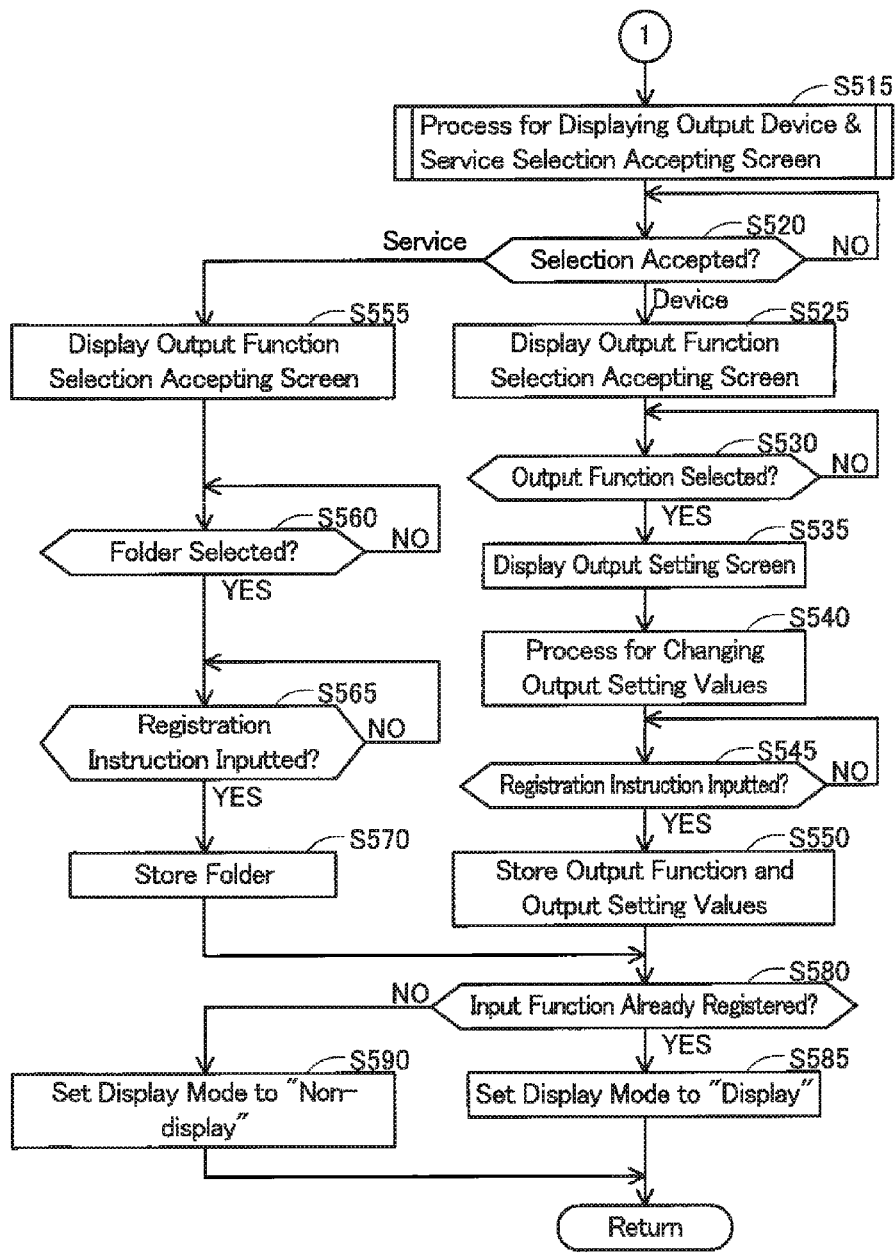
FIG. 6 is a flow chart concerning an output function process of the input and output function registration process in which the CPU controls each of the units in accordance with the function cooperative application.

The content of the process in steps S420 to S490 shown in FIG. 5 is the same as the content of the process in steps S520 to S590 of FIG. 6. Specifically, the term "output function" in the process in step S520 to S590 needs only be read as "input function" in the process in steps S420 to S490. Therefore, the process in steps S420 to S490 is not described in detail here.

Figure 18:
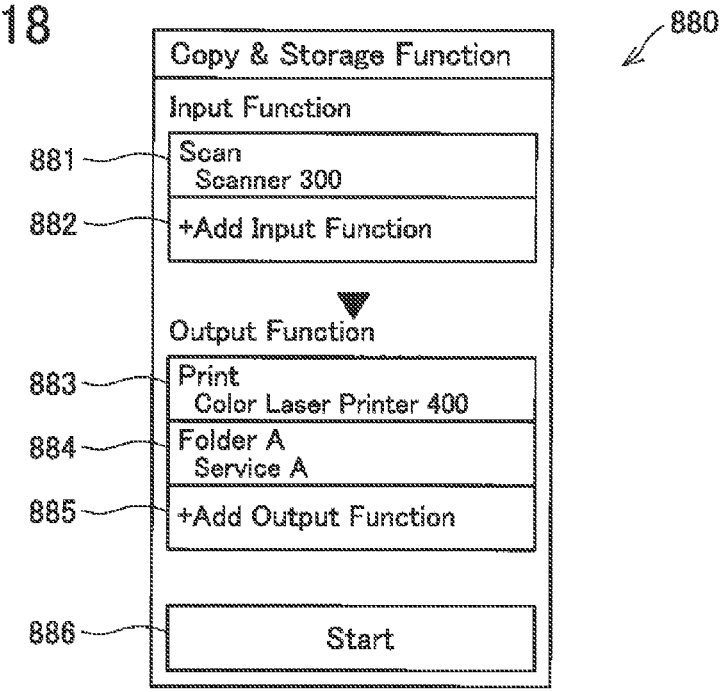
FIG. 18 shows an example display of a combinational pattern execution screen.

In step S180 of FIG. 2, the CPU 106 causes the display unit 102 to display a combinational pattern execution screen. The combinational pattern execution screen is a screen for accepting input of an execution instruction to execute a combinational pattern. FIG. 18 shows an example of a combinational pattern execution screen 880. The combinational pattern execution screen 880 is a screen displayed on the basis of the combination pattern stored in the region R11 on the combinational pattern registration table TB3 (see FIG. 10). The combinational pattern execution screen 880 contains button images 881 to 885 and a process execution button image 886. The button image 881 is an image representing an input function of the combinational pattern that is to be executed. The button image 882 is an image for accepting an execution instruction to execute a process of adding an input function. The button images 883 and 884 are each an image representing an output function of the combinational pattern that is to be executed. The button image 885 is an image for accepting an execution instruction to execute a process of adding an output function.

The process execution button image 886 is an image for accepting an execution instruction to execute the combinational pattern. In a case where the display mode was set to "non-display" in step S490 or S590, the process execution button image 886 is displayed in such a manner as to be incapable of accepting an execution instruction. An example of the display manner in which an execution instruction cannot be accepted is a grayed-out display. On the other hand, in a case where the display mode was set to "display" in step S485 or S585, the process execution button image 886 is displayed in such a manner as to be capable of accepting an execution instruction. An example of the display manner in which an execution instruction can be accepted is a normal display that is not grayed out. This makes it possible, on the condition that selection of both an input function and an output function has been completed, to accept an execution instruction to execute the combinational pattern.

In step S190, the CPU 106 determines the content of an instruction from the user. If any instruction has not been inputted (S190: NO), the CPU 106 returns to step S190. On the other hand, if the CPU 106 determines that an add instruction to add an input function or an output function has been inputted (S190: Add Instruction), the CPU 106 returns to step S175. This determination may be made depending on whether or not the button image 882 or 885 has been tapped. If the CPU 106 determines that an execution instruction to execute the combinational pattern has been inputted (S190: Execution Instruction), the CPU 106 proceeds to step S195. This determination may be made depending on whether or not the process execution button image 886 has been tapped.

In step S195, the CPU 106 executes the combinational pattern. As an example, an operation in which the combinational pattern stored in the region R11 is executed is described. The CPU 106 sends a scan execution command to the scanner 300 via wireless communication 150. Once the scanner 300 generates scanned data in accordance with the input setting values 623, the CPU 106 obtains the scanned data from the scanner 300 via the wireless communication 150. The CPU 106 generates print data and storage data from the scanned data in accordance with the output setting values 626. The storage data may be data obtained by compressing the scanned data in a predetermined format. The CPU 106 sends the print data thus generated to the color laser printer 400 via the wireless communication 150. The color laser printer 400 executes the print process with use of the print data. This achieves a copy function. Further, the CPU 106 sends the storage data thus generated to the server 511 via wireless communication 151. The service A executed in the server 511 causes the storage data to be stored in the folder A. This achieves a storage function.

<Effects>

The function cooperative application 121 described in this specification makes it possible to select an input function of a combinational pattern (S430) and select a plurality of output functions of the combinational pattern (S530). Moreover, upon receiving an execution instruction to execute the combinational pattern (S190: Execution Instruction), the function cooperative application 121 can execute the combinational pattern (S195). This makes it possible to pass data from a single input function onto each of a plurality of output functions by executing a single combinational pattern, thus making it possible to execute a plurality of functions (e.g. a copy function and a storage function). This eliminates the need to repeatedly input more than once an operation of causing a plurality of functions to be executed, thus making it possible to enhance convenience.

The function cooperative application 121 described in this specification makes it possible to, upon accepting an add instruction to add an output function that constitutes a combinational pattern (S190: Add Instruction), add the output function (S175). This makes it possible to generate a combinational pattern that is constituted by a single input function and a plurality of output functions.

The input functions and output functions of a plurality of devices (e.g. the inkjet MFN 200 and 250, the scanner 300, and the color laser printer 400) can be stored in the registered device table TB1 in association with the plurality of devices, respectively (S250). Further, the output function of the information processing apparatus 100 can be stored in the registered device table TB1 in association with the information processing apparatus 100 (S250). Further, the input functions and output functions of a plurality of services (e.g. the services A and B) can be stored in the registered service table TB2 in association with the plurality of services, respectively (S350). Moreover, it is possible to cause the display unit 102 to display the input functions and output functions stored in the registered device table TB1 and those stored in the registered service table TB2 and accept selection of an input function and an output function that constitute a combinational pattern (S430, S460, S530, S560). This makes it possible to prevent an inappropriate input function or output function from being selected as an input function or output function that constitutes a combinational pattern.

A combinational pattern generated by a user can be stored in the combinational pattern registration table TB3 (S450, S470, S550, S570). Moreover, a list of registered combinational patterns registered in the combinational pattern registration table TB3 can be displayed (S150), and in a case where a process execution command to execute any of the combinational patterns has been inputted (S160: Registered Combinational Pattern), the combinational pattern thus selected can be executed (S195). This makes it possible to invoke and execute a combinational pattern, thus making it possible to improve user-friendliness.

Input setting values (S440) and output setting values (S540) set by the user can be stored in the combinational pattern registration table TB3 (S450, S550). Moreover, a registered combinational pattern can be executed on the basis of the input setting values and output setting values thus stored (S195). This eliminates the need to set input setting values or output setting values each time, thus making it possible to improve user-friendliness.

It is possible to set the output function display settings 607 and 645 to "on" for those output functions which have yet to be selected as an output function of a newly-registered combinational pattern and set the output function display settings 607 and 645 to "off" for those output functions which have already been selected as an output function of a newly-registered combinational pattern (S630, S650, S660). Moreover, the output function selection accepting screen 860 (see FIG. 15) and the output function selection accepting screen 890 (see FIG. 17) display only those output functions for which the output function display settings 607 and 645 have been set to "on" (S525, S555). This makes it possible to, in selecting an output function that constitutes a newly-registered combinational pattern, prevent the same output function from being redundantly selected.

The information processing apparatus 100 makes it possible to exchange data between a device included in a local area network and a device included in the Internet. This makes it possible to constitute a combinational pattern by using an input function that is provided by a device (e.g. the inkjet MFP 200) included in the network N1, which is a local area network, and an output function that is provided by a device (e.g. the servers 511 and 512) included in the Internet 510. Further, this makes it possible to constitute a combinational pattern by using an input function that is provided by a device included in the Internet 510 and an output function that is provided by a device included in the network N1.

It is possible to constitute a combinational pattern by using an input function that is provided by a device included in the network N1 or in the Internet 510 and an output function of the information processing apparatus 100. An example of such a combinational pattern is a combination of the scan function that is provided by the scanner 300 and the write function of the information processing apparatus 100, as indicated by the region R12 on the combinational pattern registration table TB3 (see FIG. 10). This makes it possible to use the information processing apparatus 100 and an external device other than the information processing apparatus 100 in combination.

It is possible to constitute a combinational pattern by using a device (e.g. the inkjet MFPs 200 and 250) including a plurality of processing functions such as input functions and output functions. An example of such a combinational pattern is a combination of the scan function that is provided by the scanner 300 and the print function and write function that are provided by the inkjet MFP 200, as indicated by the region R13 on the combinational pattern registration table TB3. This makes it possible to, by executing a single combinational pattern, cause a single device to execute a plurality of output functions, thus making it possible to enhance convenience.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modification>

The embodiment has been described in this specification by taking, as an example, a case where a single input function and a plurality of output functions are combined. However, the embodiment does not imply any limitation. It is also possible to combine a plurality of input functions and a single output function. An example of such a combinational pattern is a combination of the scan functions that are provided by the scanner 300 and the inkjet MFP 200 and the print function of the color laser printer 400, as indicated by the region R14 on the combinational pattern registration table TB3 (see FIG. 10). This makes it possible to, by executing a single combinational pattern, divide a document into parts, read the parts with the scanner 300 and the inkjet MFP 200 to generate items of scanned data respectively, and print the items of scanned data with the color laser printer 400. This makes it possible to shorten the length of time required for a scan process.

Further, it is also possible to combine a plurality of input functions and a plurality of output functions. An example of such a combinational pattern is a combination of the scan functions that are provided by the scanner 300 and the inkjet MFP 200 and the print functions of the color laser printer 400 and the inkjet MFP 250. This makes it possible to, by executing a single combinational pattern, divide a document into parts, read the parts with the scanner 300 and the inkjet MFP 200 to generate items of scanned data respectively, and print the items of scanned data with the color laser printer 400 and the inkjet MFP 250 respectively. This makes it possible to shorten the length of time required for a scan process and a print process.

It is also possible to combine one or more input functions and one or more output functions in achieving a single combination of functions. For example, a copy function may be achieved by combining a single input function and a plurality of output functions. An example of such a combinational pattern is a combination of the scan function that is provided by the scanner 300 and the print functions of the color laser printer 400 and the inkjet MFP 250. Further, for example, a storage function may be achieved by combining a plurality of input functions and a single output function. An example of such a combinational pattern is a combination of the scan functions that are provided by the scanner 300 and the inkjet MFP 200 and the write function of the information processing apparatus 100.

It is possible to omit the process of displaying the registered device & service list screen (S110 to S130, S155). In this case, selection of an output function may be accepted by displaying lists of output functions of communicable devices on the output function selection accepting screen 860 (S525) and the output function selection accepting screen 890 (S555). Further, selection of an input function may be accepted by displaying a list of input functions of communicable devices on the input function selection accepting screen (S425, S455). For that purpose, in general, the information processing apparatus 100 needs only include at least "receiving of a first selection", "receiving of a second selection", "receiving of an execution-start instruction", "acquiring of first data" and "outputting of second data". As a specific example, the information processing apparatus 100 needs only execute at least steps S430 and S460, steps S530 and S560, step S190, and step S195.

In step S460, the CPU 106 may determine whether or not any of the files has been selected as an input function. This makes it possible to download the selected file via a network.

Data that is handled by the function cooperative application 121 is not limited to image data. The function cooperative application 121 may handle text data, document-format data for use in word processor software, stroke data and vector data for use as embroidery data for sewing machines, etc.

Examples of output functions are not limited to those functions mentioned above, such as print functions and write functions. For example, in a case where a device that provides an output function is a sewing machine, an embroidery function of embroidering on the basis of stroke data or the like can be used as an output function.

Examples of combinational patterns are not limited to those functions mentioned above, such as a copy function, a storage function, and a copy & storage function. It is possible to achieve various combinational patterns by combining an input function(s) and an output function(s). For example, a fax function of transmitting a scanned document can be achieved by combining a scan function as an input function and a transmitting function as an output function.

The content of the output setting values (see FIG. 16) described in the present embodiment is a mere example, and it is possible to use various values.

The communication between the access point 500 and each of the devices such as the inkjet MIT 200 may be either wireless or wired. Further, the information processing apparatus 100 may communicate directly with each of the devices without the access point 500. In so doing, the information processing apparatus 100 may communicate with each of the devices either wiredly or wirelessly.

The examples of displays on the display unit 102 in FIGS. 11 through 18 are mere examples. Various display forms of images may be displayed on the display unit 102.

The information processing apparatus 100 may be configured such that an external memory such as an SD card (registered trademark of SD Association) can be connected thereto. Moreover, the information processing apparatus 100 may be configured such that the various types of data are stored in the external memory instead of being stored in the storage unit 109.

What is claimed is:

1. A non-transitory computer-readable recording medium storing computer-readable instructions for an information processing apparatus configured to communicate with a plurality of devices, the information processing apparatus comprising a processor, and the computer-readable instructions, when executed by the processor, causing the information processing apparatus to perform:
   receiving an instruction for selecting one input function from among a plurality of input functions, the plurality of input functions being provided by the plurality of devices and the information processing apparatus;
   receiving an instruction for selecting at least two output functions from among a plurality of output functions, the plurality of output functions being provided by the plurality of devices and the information processing apparatus, and the at least two output functions including a first output function and a second output function;
   receiving an execution-start instruction to execute the selected one input function and the selected at least two output functions in a function cooperative manner;
   transmitting, in response to receiving the execution-start instruction, a command to one of the plurality of devices and the information processing apparatus that provides the selected one input function;
   receiving first data from one of the plurality of devices and the information processing apparatus that provides the selected one input function,
   wherein the first data is generated, by processing the one input function in response to the command, in one of the plurality of devices and the information processing apparatus that provides the selected one input function; and
   outputting second data related to the received first data to at least one of the plurality of devices and the information processing-apparatus that provides the selected first output function and the selected second output function.

2. The non-transitory computer-readable recording medium as in claim 1, wherein
   the computer-readable instructions further cause the information processing apparatus to perform storing the one input function and the at least two output functions in association with each of the plurality of devices and the information processing apparatus in a memory of the information processing apparatus, and
   the receiving of the instruction for selecting one input function includes displaying the one input function on a display of the information processing apparatus, and
   the receiving of the instruction for selecting at least two output functions includes displaying the at least two output functions on the display.

3. The non-transitory computer-readable recording medium as in claim 1, wherein
   the computer-readable instructions further cause the information processing apparatus to perform storing at least one combinational pattern of one input function and the at least two output functions in a memory of the information processing apparatus, and
   the receiving of the instruction for selecting one input function and the receiving of the instruction for selecting at least two output functions include:
      displaying the at least one combinational pattern on a display of the information processing apparatus; and
      receiving a selection of a combinational pattern from the displayed at least one combinational pattern,
   the one input function, the first output function and the second output function are selected by the selection of the combinational pattern.

4. The non-transitory computer-readable recording medium as in claim 3, wherein the computer-readable instructions further cause the information processing apparatus to perform:
   receiving an input of a first setting and storing the first setting in the memory, the first setting being related to the one input function included in the at least one combinational pattern to be stored in the memory; and
   receiving an input of second settings and storing the second settings in the memory, the second settings being related to the first output function and the second output function included in the at least one combinational pattern to be stored in the memory,
   wherein the receiving of the first data includes receiving the first data in accordance with the first setting, and
   wherein the outputting of the second data includes outputting the second data in accordance with the second settings.

5. The non-transitory computer-readable recording medium as in claim 3, wherein the computer-readable instructions further cause the information processing apparatus to perform:
   displaying a specific screen on the display for receiving selection of the at least two output functions included in the at least one combinational pattern to be stored in the storing; and
   receiving operations for sequentially selecting the first output function and the second output function,
   wherein
      when the first output function has not yet been selected, the plurality of output functions is displayed in the specific screen in a first manner capable of being selected, and
      when the first output function has been selected, a specific output function that was selected as the first output function is displayed in the specific screen in a second manner incapable of being selected, and output functions other than the specific output function are displayed in the first manner.

6. The non-transitory computer-readable recording medium as in claim 1, wherein
   the one input function and the plurality of output functions are functions selected from among functions provided to a first device included in a first network and a second device included in a second network broader than the first network, the first device and the second device configured to communicate with a network interface of the information processing apparatus.

7. The non-transitory computer-readable recording medium as in claim 6, wherein
   the first network is a local area network, and
   the second network is the Internet.

8. The non-transitory computer-readable recording medium as in claim 1, wherein
   the plurality of output functions includes a function to store the second data in a memory of the information processing apparatus.

9. The non-transitory computer-readable recording medium as in claim 1, wherein the first and second output functions are provided by one single device from among the plurality of devices and the information processing apparatus.

10. The non-transitory computer-readable recording medium as in claim 1, wherein
the one input function is:
a scan function to scan a document and create the first data; or
a read function to read the first data stored in a device provided with the one input function, and
the output functions include:
a print function that performs a print process by using the second data; and
a write function to store the second data in a device provided with the output functions.

11. The non-transitory computer-readable recording medium as in claim 1, wherein
the one input function is a scan function to scan a document and create the first data, and
the first output function is a print function that performs a print process by using the second data; and
the second output function is a write function to store the second data in a device provided with the second output function.

12. An information processing apparatus configured to communicate with a plurality of devices,
the information processing apparatus comprising a processor configured to perform:
receiving an instruction for selecting one input function from among a plurality of input functions, the plurality of input functions being provided by the plurality of devices and the information processing apparatus;
receiving an instruction for selecting at least two output functions from among a plurality of output functions, the plurality of output functions being provided by the plurality of devices and the information processing apparatus, and the at least two output functions including a first output function and a second output function;
receiving an execution-start instruction to execute the selected one input function and the selected at least two output functions in a function cooperative manner;
transmitting, in response to receiving the execution-start instruction, a command to one of the plurality of devices and the information processing apparatus that provides the selected one input function;
receiving first data from one of the plurality of devices and the information processing apparatus that provides the selected one input function,
wherein the first data is generated, by processing the one input function in response to the command, in one of the plurality of devices and the information processing apparatus that provides the selected one input function; and
outputting second data related to the received first data to at least one of the plurality of devices and the information processing apparatus that provides the first output function and the second output function.

13. A method executed by a processing unit for controlling an information processing apparatus configured to communicate with a plurality of devices, the method comprising:
receiving an instruction for selecting one input function from among a plurality of input functions, the plurality of input functions being provided by the plurality of devices and the information processing apparatus;
receiving an instruction for selecting at least two output functions from among a plurality of output functions, the plurality of output functions being provided by the plurality of devices and the information processing apparatus, and the at least two output functions including a first output function and a second output function;
receiving an execution-start instruction to execute the selected one input function and the selected at least two output functions in a function cooperative manner;
transmitting, in response to receiving the execution-start instruction, a command to one of the plurality of devices and the information processing apparatus that provides the selected one input function;
receiving first data from one of the plurality of devices and the information processing apparatus that provides the selected one input function,
wherein the first data is generated, by processing the one input function in response to the command, in one of the plurality of devices and the information processing apparatus that provides the selected one input function; and
outputting second data related to the received first data to at least one of the plurality of devices and the information processing apparatus that provides the first output function and the second output function.

14. An information processing apparatus configured to communicate with a plurality of devices comprising:
means for determining one input source and one input function, the one input source being one of the plurality of devices and the information processing apparatus, the one input function being processed in the one input source;
means for determining at least one output destination and at least two output functions including a first output function and a second output function, the at least one output destination being one of the plurality of devices and the information processing apparatus, each of the at least two output functions being processed in the at least one output destination;
means for receiving an execution-start instruction to execute the determined one input function and the determined at least two output functions in a function cooperative manner; and
means for outputting first data received from the one input function to the at least one output destination that provides the first output function and the second output function.

* * * * *